US009130400B2

(12) United States Patent
Terlizzi et al.

(10) Patent No.: US 9,130,400 B2
(45) Date of Patent: *Sep. 8, 2015

(54) MULTIPORT POWER CONVERTER WITH LOAD DETECTION CAPABILITIES

(75) Inventors: Jeffrey J. Terlizzi, San Francisco, CA (US); Nicholas A. Sims, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 444 days.

This patent is subject to a terminal disclaimer.

(21) Appl. No.: 12/566,594

(22) Filed: Sep. 24, 2009

(65) Prior Publication Data

US 2011/0068626 A1    Mar. 24, 2011

(51) Int. Cl.
| | |
|---|---|
| *H02J 3/14* | (2006.01) |
| *H02J 1/08* | (2006.01) |
| *H02J 1/14* | (2006.01) |
| *H02J 7/00* | (2006.01) |
| *H02J 7/04* | (2006.01) |
| *H02J 9/00* | (2006.01) |

(52) U.S. Cl.
CPC ... *H02J 1/08* (2013.01); *H02J 1/14* (2013.01); *H02J 7/0027* (2013.01); *H02J 7/0036* (2013.01); *H02J 7/045* (2013.01); *H02J 9/005* (2013.01); *H02J 2007/0062* (2013.01)

(58) Field of Classification Search
CPC .......... H02J 3/14; H02J 7/0042; G06F 1/3203
USPC .......................................... 713/300; 320/107
See application file for complete search history.

(56) References Cited

U.S. PATENT DOCUMENTS

| | | | | |
|---|---|---|---|---|
| 3,723,815 | A | * | 3/1973 | Ambler et al. ................... 361/45 |
| 4,205,306 | A | * | 5/1980 | Turlej ............................ 340/629 |
| 4,211,933 | A | * | 7/1980 | Hedges et al. ................... 307/35 |
| 4,213,058 | A | * | 7/1980 | Townsend ........................ 307/40 |
| 4,245,319 | A | * | 1/1981 | Hedges .......................... 700/296 |
| 4,324,987 | A | * | 4/1982 | Sullivan et al. .................. 307/35 |
| 4,336,462 | A | * | 6/1982 | Hedges et al. ................... 307/35 |
| 4,454,596 | A | * | 6/1984 | Wunsch et al. ........... 361/679.21 |
| 4,471,232 | A | * | 9/1984 | Peddie et al. .................... 307/35 |

(Continued)

FOREIGN PATENT DOCUMENTS

EP    2487969 A1    8/2012

OTHER PUBLICATIONS

Sims et al., U.S. Appl. No. 12/370,488, filed Feb. 12, 2009.

(Continued)

*Primary Examiner* — Jared Fureman
*Assistant Examiner* — Alfonso Perez Borroto
(74) *Attorney, Agent, or Firm* — Downey Brand LLP

(57) ABSTRACT

Power converters are provided that convert alternating current (AC) power to direct current (DC) power. A power converter may have multiple ports. Each port may have an associated connector with multiple power and data terminals. When an electronic device is connected to a given port, the electronic device draws DC power from the power converter. To ensure that the capacity of the power converter is not exceeded when multiple devices are connected to the ports of the power converter, the power converter may actively monitor its ports for active loads. Load detection circuitry can determine what number of ports are active. Control circuitry can compute a per-port available DC power level based on the number of active ports and can provide this information to connected devices.

20 Claims, 6 Drawing Sheets

(56) References Cited

U.S. PATENT DOCUMENTS

| | | | |
|---|---|---|---|
| 4,574,266 A | 3/1986 | Valentine | |
| 4,819,180 A * | 4/1989 | Hedman et al. | 700/291 |
| 5,612,609 A | 3/1997 | Choi | |
| 5,642,267 A | 6/1997 | Brkovic et al. | |
| 5,737,706 A | 4/1998 | Seazholtz et al. | |
| 6,046,513 A * | 4/2000 | Jouper et al. | 307/31 |
| 6,125,048 A * | 9/2000 | Loughran et al. | 363/78 |
| 6,129,598 A * | 10/2000 | Yu et al. | 439/883 |
| 6,215,288 B1 | 4/2001 | Ramsey et al. | |
| 6,956,464 B2 * | 10/2005 | Wang et al. | 375/258 |
| 7,017,055 B1 * | 3/2006 | Ho | 713/300 |
| 7,030,596 B1 | 4/2006 | Salerno et al. | |
| 7,085,876 B2 * | 8/2006 | Lai et al. | 710/313 |
| 7,142,411 B2 * | 11/2006 | McLeod | 361/624 |
| 7,170,194 B2 * | 1/2007 | Korcharz et al. | 307/21 |
| 7,177,673 B2 * | 2/2007 | Matsumura et al. | 600/523 |
| 7,244,150 B1 * | 7/2007 | Brase et al. | 439/668 |
| 7,293,118 B1 * | 11/2007 | Wright | 710/15 |
| 7,404,091 B1 * | 7/2008 | Gere | 713/300 |
| 7,460,535 B2 * | 12/2008 | Govindaraman | 370/392 |
| 7,461,194 B2 * | 12/2008 | Ohara et al. | 710/305 |
| 7,478,191 B2 * | 1/2009 | Wurzburg et al. | 710/316 |
| 7,482,708 B1 * | 1/2009 | Barton et al. | 307/30 |
| 7,502,878 B1 * | 3/2009 | Wright | 710/37 |
| 7,653,772 B2 * | 1/2010 | Hayashi et al. | 710/306 |
| 7,772,717 B2 * | 8/2010 | Kitamura et al. | 307/38 |
| 7,863,865 B2 * | 1/2011 | Hussain et al. | 320/140 |
| 7,917,781 B2 * | 3/2011 | Ho et al. | 713/300 |
| 7,996,690 B2 | 8/2011 | Shetty | |
| 8,150,539 B2 * | 4/2012 | Numano | 700/22 |
| 8,277,254 B2 * | 10/2012 | Yamamoto et al. | 439/620.15 |
| 8,330,422 B2 * | 12/2012 | Bayne et al. | 320/134 |
| 8,608,505 B2 * | 12/2013 | Mantay et al. | 439/505 |
| 8,727,804 B2 * | 5/2014 | McNeely et al. | 439/505 |
| 2002/0014951 A1 * | 2/2002 | Kramer et al. | 340/5.8 |
| 2002/0162036 A1 * | 10/2002 | Kim et al. | 713/300 |
| 2003/0011486 A1 * | 1/2003 | Ying | 340/825.69 |
| 2003/0052770 A1 * | 3/2003 | Mansfield et al. | 340/310.01 |
| 2003/0070103 A1 * | 4/2003 | Kim | 713/300 |
| 2005/0053087 A1 * | 3/2005 | Pulyk | 370/463 |
| 2005/0138446 A1 * | 6/2005 | Matsuda | 713/300 |
| 2005/0210304 A1 | 9/2005 | Hartung et al. | |
| 2005/0240709 A1 * | 10/2005 | Shaver | 710/313 |
| 2006/0015757 A1 * | 1/2006 | Tupman et al. | 713/300 |
| 2006/0095164 A1 * | 5/2006 | Donnelly et al. | 700/295 |
| 2006/0181241 A1 * | 8/2006 | Veselic | 320/107 |
| 2006/0214510 A1 * | 9/2006 | Patel | 307/12 |
| 2007/0070558 A1 * | 3/2007 | Liu | 361/18 |
| 2007/0108938 A1 * | 5/2007 | Veselic | 320/111 |
| 2007/0124517 A1 * | 5/2007 | Seo et al. | 710/62 |
| 2007/0141869 A1 * | 6/2007 | McNeely et al. | 439/76.1 |
| 2007/0290555 A1 * | 12/2007 | Caren | 307/31 |
| 2007/0300083 A1 | 12/2007 | Goodrum et al. | |
| 2008/0082842 A1 * | 4/2008 | Minami | 713/300 |
| 2008/0122292 A1 * | 5/2008 | Minami | 307/44 |
| 2008/0272741 A1 * | 11/2008 | Kanamori | 320/137 |
| 2009/0121684 A1 * | 5/2009 | Hussain et al. | 320/139 |
| 2009/0193276 A1 | 7/2009 | Shetty et al. | |
| 2009/0198385 A1 * | 8/2009 | Oe et al. | 700/296 |
| 2009/0267562 A1 * | 10/2009 | Guccione et al. | 320/114 |
| 2009/0271047 A1 * | 10/2009 | Wakamatsu | 700/295 |
| 2009/0319808 A1 | 12/2009 | Brundridge et al. | |
| 2009/0326728 A1 * | 12/2009 | Chrisop et al. | 700/295 |
| 2010/0052622 A1 * | 3/2010 | Chen et al. | 320/148 |
| 2010/0064153 A1 * | 3/2010 | Gk et al. | 713/310 |
| 2010/0067197 A1 * | 3/2010 | Guccione et al. | 361/728 |
| 2010/0091531 A1 * | 4/2010 | Lum | 363/84 |
| 2010/0127864 A1 * | 5/2010 | Veselic | 340/540 |
| 2010/0133908 A1 * | 6/2010 | Weng | 307/48 |
| 2010/0201308 A1 * | 8/2010 | Lindholm | 320/107 |
| 2010/0202161 A1 | 8/2010 | Sims et al. | |
| 2010/0287399 A1 * | 11/2010 | Yasuda | 713/340 |
| 2011/0018344 A1 * | 1/2011 | Liao et al. | 307/31 |
| 2011/0025277 A1 * | 2/2011 | Hussain et al. | 320/163 |
| 2011/0037428 A1 * | 2/2011 | Sakaguchi et al. | 320/107 |
| 2011/0038582 A1 * | 2/2011 | DiFonzo et al. | 385/57 |
| 2011/0068626 A1 | 3/2011 | Terlizzi et al. | |
| 2011/0068819 A1 * | 3/2011 | Sims et al. | 324/764.01 |
| 2011/0127950 A1 * | 6/2011 | Veselic | 320/107 |
| 2011/0273144 A1 * | 11/2011 | Yu et al. | 320/162 |
| 2012/0028488 A1 * | 2/2012 | Puschnigg et al. | 439/189 |
| 2012/0176823 A1 * | 7/2012 | Sims et al. | 363/69 |
| 2012/0209442 A1 | 8/2012 | Ree | |
| 2013/0175977 A1 * | 7/2013 | Tinaphong et al. | 320/107 |
| 2013/0207595 A1 * | 8/2013 | Helfrich | 320/107 |
| 2014/0075212 A1 | 3/2014 | Urbina et al. | |

OTHER PUBLICATIONS

Sims et al., U.S. Appl. No. 12/566,593, filed Sep. 24, 2009.
Terlizzi et al., U.S. Appl. No. 12/239,345, filed Sep. 26, 2008.

* cited by examiner

MULTIPORT POWER CONVERTER WITH LOAD DETECTION CAPABILITIES

BACKGROUND

This relates to power converters, and more particularly, to multiport power converters.

Power converter circuitry can be used to convert alternating current (AC) power into direct current (DC) power. AC power is typically supplied from wall outlets and is sometimes referred to as line power. Electronic devices include circuitry that runs from DC power. The DC power that is created by an AC-to-DC power converter may be used to power an electronic device. The DC power that is created may also be used to charge a battery in an electronic device.

In some applications, AC to DC power converter circuitry may be incorporated into an electronic device. For example, desktop computers often include AC to DC power converter circuitry in the form of computer power supply units. A computer power supply unit has a socket that receives an AC power cord. With this type of arrangement, the AC power cord may be plugged directly into the rear of the computer to supply AC power without using an external power converter.

Although desktop computers are large enough to accommodate internal power supplies, other devices such as handheld electronic devices and portable computers are not. As a result, typical handheld electronic devices and laptop computers require the use of external power converters. When untethered from the power converter, a handheld electronic device or portable computer may be powered by an internal battery. When AC line power is available, the power converter is used to convert AC power into DC power for the electronic device.

Compact AC-DC power converter designs are typically based on switched-mode power supply architectures. Switched-mode power converters contain switches such as transistor-based switches that work in conjunction with energy storage components such as inductive and capacitive elements to regulate the production of DC power from an AC source. A feedback path may be used to tap into the converter output and thereby ensure that a desired DC voltage level is produced under varying loads.

Some power converters have more than one port. This allows multiple devices to be powered at a single time, but requires that the power converter be capable of delivering sufficient power to satisfy a worst-case scenario when all ports are occupied. The need to over-provision a power converter in this way to accommodate worst-case scenarios can lead to undesirable increases in the size and cost of the power converter.

SUMMARY

An alternating-current (AC) to direct-current (DC) power converter may have multiple ports. The ports may have connectors such as universal serial bus connectors that allow cellular telephones, media players, or other devices to be connected to the power converter. When a port is occupied by an electronic device, DC power may be conveyed to that electronic device to power the electronic device. For example, a battery in the electronic device may be recharged.

In some situations, only a single port will be occupied. In other situations, a user may plug electronic devices into two or more ports. Because the resources of the power converter are limited, there may be a desire to limit the amount of DC power that is delivered to each port when all of the ports are occupied.

The power converter may contain load detection circuitry. For example, voltage detector circuitry in a control circuit may monitor the voltage drop that develops across current sensing resistors that are connected in series with the ports of the power converter. When a current is sensed using one of the current sensing resistors, the control circuitry can conclude that an active load is connected to the power converter.

More sensitive load current measurements may be made using a control switch and a current-limited voltage regulator. A current-limited voltage regulator may be coupled to a positive power supply output terminal in a port. The switch may be connected in series with the output terminal and may be periodically opened using the control circuitry. The voltage regulator may be based on a booster circuit that produces an output voltage that is larger than the nominal power supply voltage on the output terminal. When the switch is opened, control circuitry in the power converter can monitor the voltage on the output terminal. If no load is present, the output voltage will rise to the value produced at the output of the current-limited voltage regulator booster circuit. If an electronic device is connected to power converter, the current drawn by the electronic device will exceed the capacity of the voltage regulator, causing the output voltage to sag.

The power converter can use the current sensing resistors and other load detection circuitry to monitor the ports in the power converter and thereby determine what number of ports are connected to electronic devices or other active loads. The power converter can then compute the amount of available power per port (i.e., the per-port available DC power) based on the number of active ports.

The amount of power that is delivered to each electronic device can be regulated using control switches. Each electronic device that is connected to the power converter can also be informed of the per-port available power level. This information can be conveyed to the electronic devices using voltage codes (as an example). A pair of voltages may, for example, be produced on a pair of data lines in each port. More complex digital communications schemes may also be used to convey per-port available power information (e.g., serial and parallel buses, bidirectional and unidirectional paths, links that use synchronous or asynchronous communications, etc).

Further features of the invention, its nature and various advantages will be more apparent from the accompanying drawings and the following detailed description of the preferred embodiments.

DETAILED DESCRIPTION

Figure 1A:
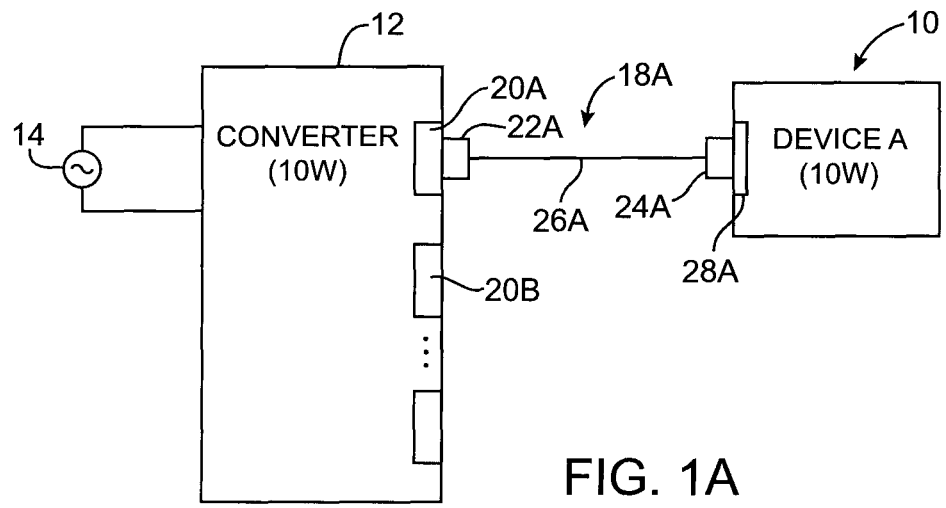
FIG. 1A is a diagram of a system including a multiport power converter to which a single electronic device has been attached in accordance with an embodiment of the present invention.

Power converters can be used to convert alternating current (AC) power into direct current (DC) power. The DC power that is produced by a power converter can be used to power an electronic device. When powered in this way, a rechargeable battery in the electronic device may be recharged.

Portable power converters are often used to power portable electronic devices. These portable electronic devices may include laptop computers, handheld electronic device, cellular telephone, media player, accessories, etc.

To reduce size and save weight, AC-DC power converters may be formed using switched-mode power supply architectures. In AC-DC power converters having switched-mode power supply designs, transistor-based switches are used in conjunction with energy storage components such as inductors and capacitors to regulate the production of DC power from an AC source.

Size and weight can be minimized by ensuring the transistor-based switches, energy storage components, and other circuitry of a given power converter are not overly large. In general, these components should be sized according to the expected power delivery requirements for the power converter.

Conventional power converters are often provided with hardwired cables and connectors. For example, a conventional power converter may have an AC connector that fits into a wall outlet and may have a DC connector that fits into a particular type of electronic device. The AC connector may be provided at the end of an AC power cord. The DC connector may be provided at the end of a DC power cable that couples the DC connector to the main body of the power converter. A user who desires to power the electronic device from a conventional power converter of this type can plug the AC connector into a wall outlet and can plug the DC connector into a mating connector on the electronic device. Conventional power converters such as these are only compatible with a particular type of electronic device and can only be used to power a single electronic device at one time.

To address these shortcomings, it may be desirable to provide more flexible power converters. For example, a power converter can be provided with multiple ports to which DC power cables can be connected. A power converter may, for example, have multiple Universal Serial Bus (USB) ports. Each USB port may have an associated connector that is adapted to receive a mating USB connector on a USB cable. If the user desires to power a single electronic device, that electronic device can be coupled to the power converter by plugging one end of a cable into the electronic device and by plugging the other end of the cable into one of the USB ports on the power converter. Because the power converter has multiple ports, it is also possible to power multiple electronic devices at the same time. If, for example, a user desires to power two devices simultaneously, a first device may be powered using a first of the USB ports on the power converter and a second device may be powered using a second of the USB ports on the power converter.

To ensure proper operation of the power converter, the power converter must have the capacity to satisfy the power demands of the electronic devices that are connected to the power converter. To avoid over-provisioning the power converter and to thereby allow the size and weight of the power converter to be minimized, it may be desirable to provide the power converter with intelligent load detection and power delivery capabilities. Particularly when the power converter has multiple ports, the power converter may sometimes be needed to supply different amounts of power to different ports. Load detection and power delivery adjustment capabilities allow the power converter and attached electronic devices to be reconfigured to meet changing needs.

Figure 1B:
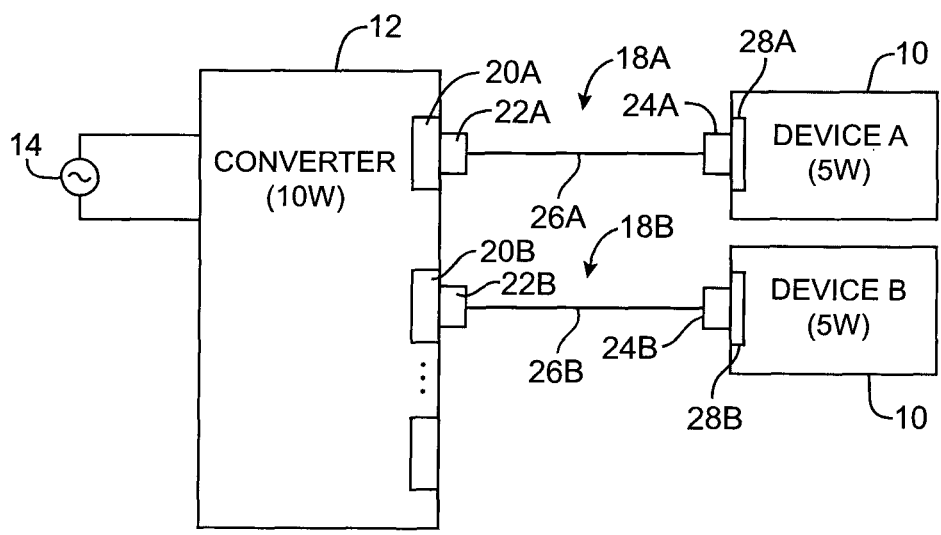
FIG. 1B is a diagram of a system including a multiport power converter to which multiple electronic devices have been attached in accordance with an embodiment of the present invention.

Consider, as an example, power converter 12 of FIGS. 1A and 1B. In the situation illustrated in FIG. 1A, there is only one electronic device 10 that is connected to power converter 12 (i.e., device A). In the situation illustrated in FIG. 1B, there are two electronic devices 10 that have been connected to FIG. 1B (i.e., device A and device B). Devices 10 may be cellular telephones, media players, portable computers, handheld computing equipment, or other electronic devices. Power converter 12 can sense which ports are active and can use each port to deliver an appropriate amount of power so that the capacity of power converter 12 is not exceeded.

For example, in the situation of FIG. 1A, power converter 12 can deliver 10 W of power to device A, whereas in the situation of FIG. 1B, power converter 12 can deliver 5 W of power to device A and 5 W of power to device B. In this example, power converter 12 has a maximum capacity of 10 W. When only a single device is drawing power, this capacity can be dedicated to powering that single device (e.g., device A of FIG. 1A). When two devices are drawing power as shown in FIG. 1B, the 10 W total capacity of converter 12 can be shared between device A and device B. To ensure that devices A and B do not draw more than 5 W each, devices A and B may be informed by converter 12 that there is only a maximum power available of 5 W per port. Power regulation circuitry can also be used in converter 12 to ensure that per-port power limits are not exceeded.

Converter 12 can inform attached devices of the available per-port power limit using voltage codes, resistive codes, serial or parallel digital communications, using asynchronous communications, using synchronous communications, etc. Prior to communicating the maximum per-port available power to attached devices, converter 12 can examine each port to determine whether a load is attached. From this load monitoring operation, converter 12 can calculate how many devices are connected to converter 12. By determining what number of devices are connected to converter 12 using load detection circuitry, converter 12 and can use this information to determine the maximum per-port available power (i.e., by dividing the maximum capacity of converter 12 by the number of connected devices).

As shown in FIGS. 1A and 1B, AC power can be provided to converter 12 from AC source 14 (e.g., an AC wall outlet). The AC line power from outlet 14 may be converted into DC power by converter 12 (e.g., using a switched-mode power supply design). Although AC-DC converters are sometimes described herein as an example, converter 12 may, in general, be any suitable type of converter (e.g., a DC-DC converter, etc.). Converter 12 may have multiple ports (e.g., port A, port B, etc.). There may be, for example, two ports in converter 12, three ports, four ports, more than four ports, etc. Arrangements in which converter 12 has two ports are sometimes described herein as an example.

As shown in FIGS. 1A and 1B, there may be connectors associated with the ports of converter 12. For example, connectors 20A may be associated with a first port, connector 20B may be associated with a second port, etc.

Electronic devices 10 may also have connectors (e.g., 28A, 28B, etc.). Cables such as cables 18A and 18B may be used to interconnect converter 12 and devices 10. For example, cable 18A may have a first connector 22A that plugs into mating connector 20A of converter 12 and may have a second connector 24A that plugs into mating connector 28A of device 10. Cable portion 26A may contain conductive lines (e.g., wires) that connect the terminals of connector 22A to the terminals of connector 24A. Device B and other devices may likewise be coupled to converter 12. For example, device B may have a connector 28B that is coupled to connector 20B of a second port in converter 12 using connector 24B, cable portion 26B, and connector 22B of cable 18B, as shown in FIG. 1B. The use of cables such as cables 18A and 18B to connect one or more devices 10 to respective ports of converter 12 is merely illustrative. If desired, converter 12 may have ports that receive electronic devices 10 directly (with no intervening cables) or that are connected to devices 10 using hardwired cables (e.g., cables that are integrated with converter 12 and that do not include connectors such as connectors 22A and 22B).

The connectors of converter 12 such as connectors 20A and 20B may be USB connectors (e.g., female USB connectors for receiving mating male USB plugs on cables 18A and 18B). The connectors on devices 10 may be USB connectors, 30-pin connectors, or other suitable connectors.

Figure 2:
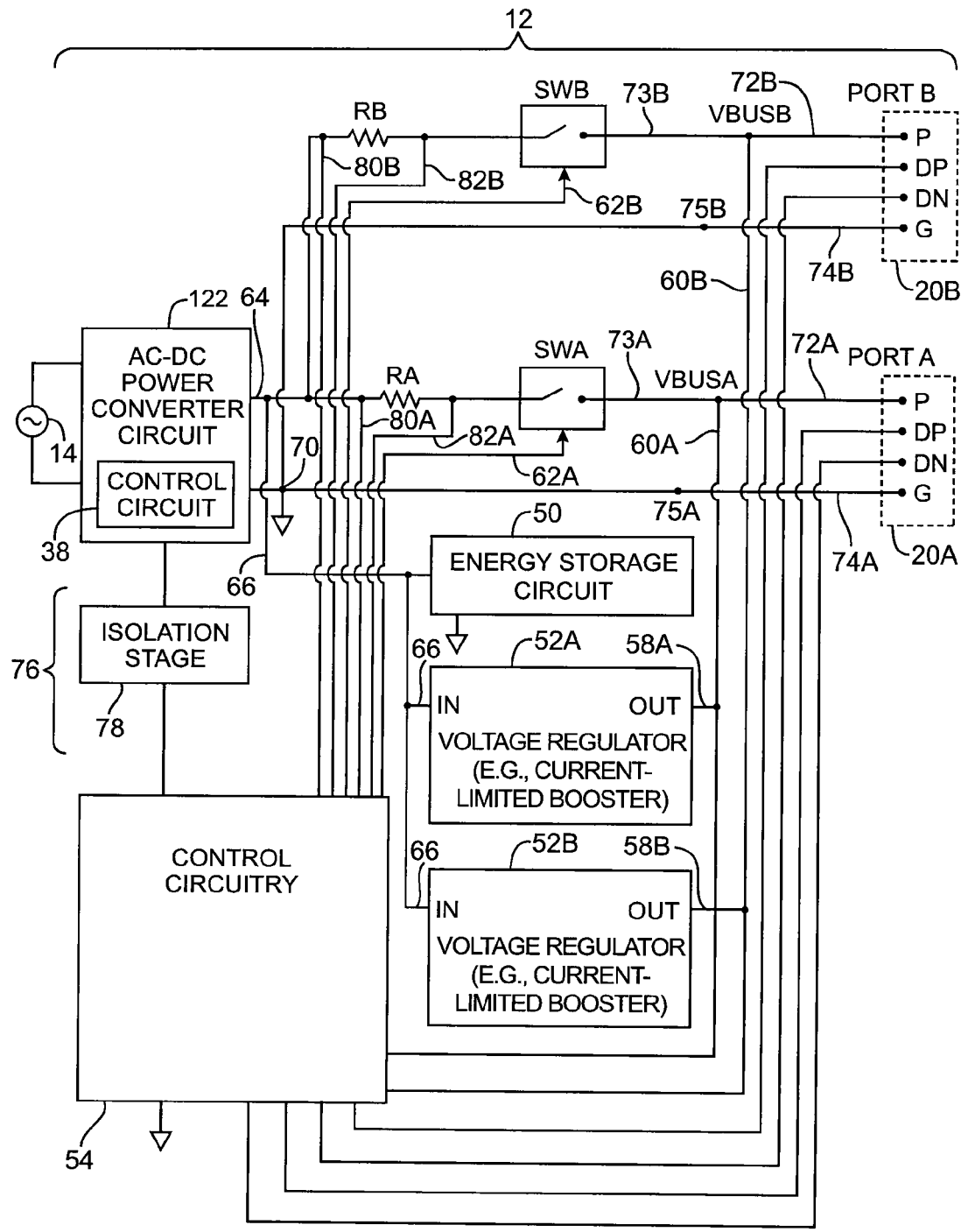
FIG. 2 is a circuit diagram of an illustrative multiport power converter in accordance with an embodiment of the present invention.

Illustrative circuitry for power converter 12 is shown in FIG. 2. Power converter 12 of FIG. 2 is a two port power converter that converts AC power from AC source 14 to DC power on ports A and B. This is, however, merely illustrative. In general, power converters, which are sometimes referred to as power adapters, can be used to convert any suitable types of power. For example, a power converter may be used to boost or reduce a DC power level. Power converters such as power converter 12 of FIG. 2 that can be used in converting AC power to DC power are sometimes described herein as an example. In general, however, the power converter circuitry may include circuitry for transforming any suitable input signal (e.g., AC or DC currents and voltages) into any suitable output signal (e.g., boosted, reduced, or otherwise transformed AC or DC currents and voltages). The use of power converters such as AC-to-DC power converters that produce regulated DC output voltages from AC input signals is merely illustrative.

As shown in FIG. 2, power converter 12 may be plugged into a source of AC line power (source 14) such as a wall outlet. The AC power source may provide power at 120 volts or 240 volts (as examples). Circuitry in the power converter such as AC-DC power converter circuit 122 may convert the AC line power that is received into DC power. For example, an AC to DC power converter may receive AC line power at an input and may supply DC power at a corresponding output. The output voltage level may be 12 volts, 5 volts, or any other suitable DC output level.

The circuitry of AC-DC power converter circuit 122 may be based on a switched mode power supply architecture. Switched mode power supplies use switches such as metal-oxide-semiconductor power transistors and associated control schemes such as pulse-width modulation control schemes or frequency modulation control schemes to implement power conversion functions in relatively compact circuits. When the switching circuitry has a first configuration, power is transferred from a power source to a storage element such as an inductor (e.g., a transformer) or a capacitor. When the switching circuitry has a second configuration, power is released from the storage element into a load. Feedback may be used to regulate the power transfer operation and thereby ensure that the output voltage is maintained at a desired level. Examples of switched mode power supply topologies that may be used in a power converter include buck converters, boost converters, flyback converters, etc.

With one suitable arrangement, which is sometimes described herein as an example, AC to DC power converter circuit 122 may be implemented using a voltage rectifier and flyback converter. The voltage rectifier converts AC line power from AC source 14 into DC power at a relatively high voltage level. The flyback converter portion of the power converter steps down the DC power at the output of the rectifier circuit to 12 volts, 5 volts, or other suitably low level for operating circuitry in an electronic device. This low level DC output voltage may be presented across outputs 64 and 70. If desired, other power converter architectures may be used. The use of a switched mode power converter arrangement that is based on a flyback converter design is merely illustrative.

Load detection circuitry may be provided in power converter 12 to allow power converter 12 to detect which ports are occupied by attached loads (i.e., which ports are coupled to electronic devices 10 of FIGS. 1A and 1B). In general, an AC to DC power converter or other circuit that includes load detection circuitry may supply DC power to any suitable load. Arrangements in which electronic devices 10 serve as loads for power converter 12 are sometimes described herein as examples. Electronic devices that may receive DC power from power converter 12 include a handheld computer, a miniature or wearable device, a portable computer, a desktop computer, a router, an access point, a backup storage device with wireless communications capabilities, a mobile telephone, a music player, a remote control, a global positioning system device, a device that combines the functions of one or more of these devices, etc.

Electronic devices 10 (not shown in FIG. 2) may be connected to the terminals of ports A and B. Only two ports are shown in FIG. 2, but power converter 12 may have additional ports if desired. Each electronic device 10 may have a battery for use in powering the device when unattached to converter 12. When power converter 12 is plugged into AC power source 14 and when a given electronic device is connected to power converter 12, power converter 12 can transform AC power that is received from AC power source 14 into DC power for that device.

Each port in converter 12 may have a connector. The connectors may have any suitable number of terminals. For example, devices 10 may each have a 30-pin connector universal serial bus (USB) port into which a USB cable may be plugged. The USB cable may be used to convey DC power between a respective one of connectors 20A and 20B in power converter 12 and electronic device 10. In the example of FIG. 2, each port and its associated connector in converter 12 has four USB-type terminals. These four terminals include two power terminals P (positive power) and G (ground). These four terminals also include two data lines DP and DN. When a mating USB plug is connected, power can be delivered to a connected electronic device over the P and G power lines. Data lines DP and DN may be used to convey information to the attached device (e.g., information on a desired power draw setting for the attached device).

As shown in FIG. 2, the positive power terminal P in connector 20B may be connected to positive power supply line 72A and the positive power terminal P in connector 20A may be connected to positive power supply line 72B. Lines 72A and 72B may be use to convey a positive DC voltage at 12 volts, 5 volts, or other suitable positive DC voltage level. This DC voltage level is sometimes referred to as Vbus (i.e., Vbusa for port A and Vbusb for port B) and corresponding lines 73A and 73B are sometimes referred to as power supply buses or output lines. The ground terminal G in connector 20B may be connected to ground power supply line 74B and the ground terminal G in connector 20A may be connected to ground power supply line 74A. Ground lines 74A and 74B may be coupled to ground nodes 75A and 75B and to ground output 70 of AC-DC power converter circuit 12 and may be used to convey a ground voltage at 0 volts or other suitable ground voltage level.

When connected to power converter 12, each electronic device 10 may receive DC power through the power pins of the USB connector and cable (as an example). The use of a USB connector to connect power converter 12 and electronic device 10 is, however, merely illustrative. Any suitable plugs, jacks, ports, pins, or other connectors, may be used to interconnect power converter 12 and electronic devices if desired. Similarly, a hardwired connection or a suitable plug, jack, port, pin structure, or other connector may be used to connect power converter 12 to power source 14.

AC-DC power converter circuit 122 may convert AC power from AC source 14 to DC power on output paths 64 and 70. Path 64 may be a positive power supply line that is coupled to converter output line 73A via series-connected current sensing resistor RA and switch SWA and that is coupled to converter output line 73B via series-connected current sensing resistor RB and switch SWB. The circuitry of converter 12 such as resistors RA and RB can be used to detect when an electronic device is attached to a port. When an active device is attached to a given port, current flows across the current sensing resistor that is associated with that port. For example, when a device is connected to port A, current may flow across resistor RA. This can produce a measurable voltage drop across the voltage probe lines that are connected across the resistor.

As shown in FIG. 2, voltage measurements lines 80A and 82A may be used to route voltage measurement signals from resistor RA to control circuitry 54, whereas voltage measurement lines 80B and 82B may be used to route voltage measurement signals from resistor RB to control circuitry 54. Control circuitry 54 may include voltage detector circuitry that uses lines 80A, 80B, 82A, and 82B to measure the currents flowing through each port.

The magnitude of the voltage across resistor RA is indicative of the current flowing through port A. The magnitude of the voltage across resistor RB corresponds to the amount of current flowing through port B. Because the magnitude of the current sensing resistors RA and RB may be determined in advance, measurement of the voltages across resistors RA and RB can be used to determine the amount of current flowing through each port from Ohm's law. This calculation may be made by control circuitry 54 or other circuitry in converter 12. Control circuitry 54 may include one or more microprocessors, digital signal processors, microcontrollers, memory circuits, hardwired processing circuits, analog-to-digital and digital-to-analog converter circuits, communications circuits, etc.

Path 70 may be a ground power supply line that is coupled to ground outputs 75A and 75B of converter 12. Switching circuitry such as switches SWA and SWB may be based on any suitable electrical components that can control the flow of DC power from the output of AC-DC power converter circuit 122 to the power supply input lines associated with attached loads (i.e., the inputs of an electronic device that are connected to the output port power supply lines in converter 12). For example, switches SWA and SWB may be implemented using one or more transistors such as one or more power field-effect transistors (power FETs).

Consider an example in which an electronic device is connected to port A. During normal operation, power converter 12 may use AC-DC power converter circuit 122 to supply a DC power supply voltage on lines 64 and 70. Control circuitry 54 will close switch SWA, so line 64 will be shorted to output line 73A in port A. This allows the DC power supply voltages at the output of AC-DC power converter circuit 122 to be provided to the electronic device via outputs 72A and 74A. The circuitry of port B may operate in the same way.

AC-DC power converter circuit 122 may contain control circuitry 38 for controlling internal switching circuits (e.g., transistor-based switches). The control circuitry may be responsive to feedback signals. For example, if port A is active, a feedback path that is formed using line 60A, control circuitry 54, and isolation stage 78 in path 76 may be used to supply AC-DC power converter circuit 122 with information on the current level of voltage Vbusa on output line 73A. In response to this feedback information, the control circuitry in AC-DC power converter circuit 122 (i.e., control circuitry 38) can make real-time adjustments to the amount of DC voltage that is being supplied to the output of AC-DC power converter circuit. For example, if the DC voltage on output 64 has a nominal value Vsec of 5 volts and feedback indicates that the voltage has undesirably risen to 5.05 volts, the control circuitry in AC-DC power converter circuit 122 can make adjustments to lower the DC output voltage back to the nominal value (Vsec). If port B is active while port A is inactive, feedback of this type can be derived from feedback path 60B. When both ports A and B are active at the same time, control circuitry 54 may monitor either line 60A or 60B, may monitor both lines to produce an average feedback signal, or may monitor output 64 using a separate feedback path (as examples).

Power converter 12 may contain an energy storage circuit 50. Energy storage circuit 50 (sometimes also referred to as an energy storage element) may be based on any suitable circuitry for storing energy. As an example, energy storage circuit 50 may include one or more batteries, capacitors, etc. During operation of power converter 12 when AC-DC power converter circuit 122 is supplying power to output path 64, a path such as path 66 may be used to route power to energy storage circuit 50. The power that is routed to energy storage circuit 50 in this way may be used to replenish the battery, capacitor or other energy storage components in circuit 50. In the example of FIG. 1, energy storage circuit 50 is coupled to AC-DC power converter circuit 122 by paths 64 and 66 (and ground 70). This is, however, merely illustrative. Any suitable routing paths may be used to supply replenishing power from AC-DC power converter circuit 122 to energy storage circuit 50 if desired.

Control circuitry 54 may monitor the status of power converter 12 using paths such as paths 80A, 80B, 82A, 82B, 66, 60A, and 60B. When appropriate, monitor 54 may provide control signals to AC-DC power converter circuit 122 using paths such as path 76.

An isolation element such as isolation stage 78 may be interposed in path 76. The control signals that are provided over path 76 may be used to direct control circuitry 38 to make adjustments to the operation of converter circuit 122 (e.g., to increase or decrease the output voltage on line 64 and/or to place AC-DC power converter circuit in an appropriate operating mode). In general, any suitable number of operating modes may be supported by AC-DC power converter circuit 122.

For example, AC-DC power converter circuit 122 may be placed in one or more active modes and an optional standby mode. When in an active mode, AC-DC power converter 122 is on and supplies DC output power for replenishing energy storage circuit 50 and for supplying power to ports A and B. In standby mode, which is sometimes referred to as a sleep mode or low-power mode, AC-DC power converter circuit 122 is placed in a state in which little or no power is consumed by AC-DC power converter circuit 122 (i.e., AC-DC power converter circuit 122 is turned off by inhibiting modulation of its switched-mode power supply switches). If desired, AC-DC power converter circuit 122 may have multiple lower power states (e.g., a partly off state and a fully-off state).

When AC-DC power converter circuit 122 is in standby mode, AC-DC power converter circuit 122 is off and allows output 64 to float. In this situation, the power that has been stored in energy storage circuit 50 may be delivered to path 66 from within energy storage circuit 50. For example, if energy storage circuit 50 contains a battery or a capacitor, the battery or capacitor may be used to supply a battery or capacitor voltage to path 66. The voltage supplied by energy storage circuit 50 may be supplied at the same voltage level as the nominal output voltage level (Vsec) that AC-DC power converter circuit 122 supplies to path 64 when AC-DC power converter circuit 122 is in active mode.

Voltage regulators 52A and 52B may be current-limited circuits that produce output voltages that differ from the nominal output of AC-DC power converter circuit 122. Voltage regulators 52A and 52B may, for example, be current-limited booster circuits that each produce an output of 5.1 volts (as compared to the 5 volt output of AC-DC power converter circuit 122). Periodically, control circuitry 54 can test whether a load is present on a given port by opening the switch for that port and monitoring its power supply voltage.

Consider, as an example, the monitoring of the status of port A. To check the status of port A, control circuitry 54 may open periodically open switch SWA using control line 62A. This disconnects line 72A and line 58A from the output of converter circuit 122. If an electronic device is present on port A, voltage regulator 52A will be unable to supply all of the current needed by the device. This will cause the voltage Vbusa that is being monitored on line 60A by control circuitry 54 to drop. In this situation, control circuitry 54 can conclude that a load is present on port A. Switch SWA can then be closed to allow normal operations to continue. If, however, no electronic device is present on port A, the opening of switch SWA will cause the voltage Vbusa on line 60A to rise (e.g., to 5.1 volts). When this rise is detected, control circuitry 54 can conclude that no load is present on port A. In the same way, switch SWB may be controlled by control line 62B while voltage Vbusb on line 72B and line 58B at the output of voltage regulator 52B is being monitored using line 60B.

This type of arrangement may be used by control circuitry 54 to determine which ports have active loads. If desired, current-sensing resistors such as resistors RA and RB may be used to make load current measurements. With one suitable arrangement, the voltages across resistors RA and RB are examined before the scheduled opening of switches SWA and SWB. Resistors RA and RB are generally not too large, so as not to impede efficient power delivery to attached devices. As a result, it can be difficult to use resistors RA and RB to measure extremely low load current values (i.e., load currents of the type that can be detected using switches SWA and SWB, voltage regulators 52A and 52B, and sensing lines 60A and 60B). Current-sensing resistors RA and RB can, however, be used to perform current pre-sensing operations. For example, control circuitry 54 can examine the voltage across resistors RA and RB before opening switches SWA and SWB. If a voltage is detected across a current-sensing resistor, control circuitry 54 can conclude that the port that is associated with the detected voltage has an active load. In this situation, there is no need to open the corresponding switch SWA or SWB and the switch opening operation can be inhibited to avoid possible glitches.

If desired, other circuit arrangements may be used to poll the ports in power converter 12 to determine whether an electronic device or other load is connected to that port. The illustrative load monitoring circuitry of FIG. 2 is merely illustrative.

Once the number of active ports has been determined, control circuitry 54 can compute how much power is available for each port. For example, if the total capacity of AC-DC power converter circuit 122 is 10 W and if there is only a single electronic device connected to converter 12, control circuitry 54 may conclude that the entire 10 W capacity of converter circuit 122 is available for delivery to the connected device. If, however, there are two electronic devices connected to converter 12, control circuitry 54 may conclude that each port will be able to supply 5 W to its associated device. Computing the amount of power available for each of the active ports in this way allows the capacity of power converter circuit 122 to be intelligently shared between the devices that are connected to converter 12. It is therefore not necessary to over-provision the circuitry in converter 12.

Each device 10 that is connected to converter 12 may be informed of the amount of available power from converter 12. In some situations, relatively more power may be available. For example, when a device is the only device connected to a given power converter, the power converter may be able to supply the device with 10 W of power. In other situations, less power may be available. For example, if there are two devices connected to the given power converter, the power converter may only be able to supply each device with 5 W of power. Devices 10 generally contain power management circuitry that can be configured to adjust their power draw levels. When a device is informed that there are 10 W of power available, the device may configure its power management circuitry so that the device consumes 10 W. When a device is informed that there are 5 W of power available, the device may configure its power management circuitry so that the device consumes a reduced power of 5 W.

By advertising the amount of power that is available for each port (i.e., the per-port available power), converter 12 can reconfigure devices 10 and can effectively share a limited amount of power conversion capacity among the devices. Any suitable technique may be used by converter 12 to convey information to devices 10 that informs devices 10 the per-port power availability. For example, converter 12 may include analog communications circuitry, digital communications circuitry, circuitry that generates codes based on fixed or time-varying resistance values, fixed or time-varying current values, or fixed or time varying voltage values. Coding schemes may present a particular circuit parameter (resistance, current, voltage, inductance, etc.) across a pair of terminals in a port or may present a series of multiple circuit parameters (e.g., across a single pair of terminals or across multiple sets of terminals). Combinations of these coding approaches may also be used.

With one illustrative configuration, which is sometimes described herein as an example, converter 12 may include circuitry that presents voltage-based codes to devices 10. The voltage-based codes may instruct a device to configure its power management circuitry so that the device consumes a particular desired amount of power. The circuitry for producing the voltage-based codes may be implemented as part of control circuitry 54.

Figure 3:
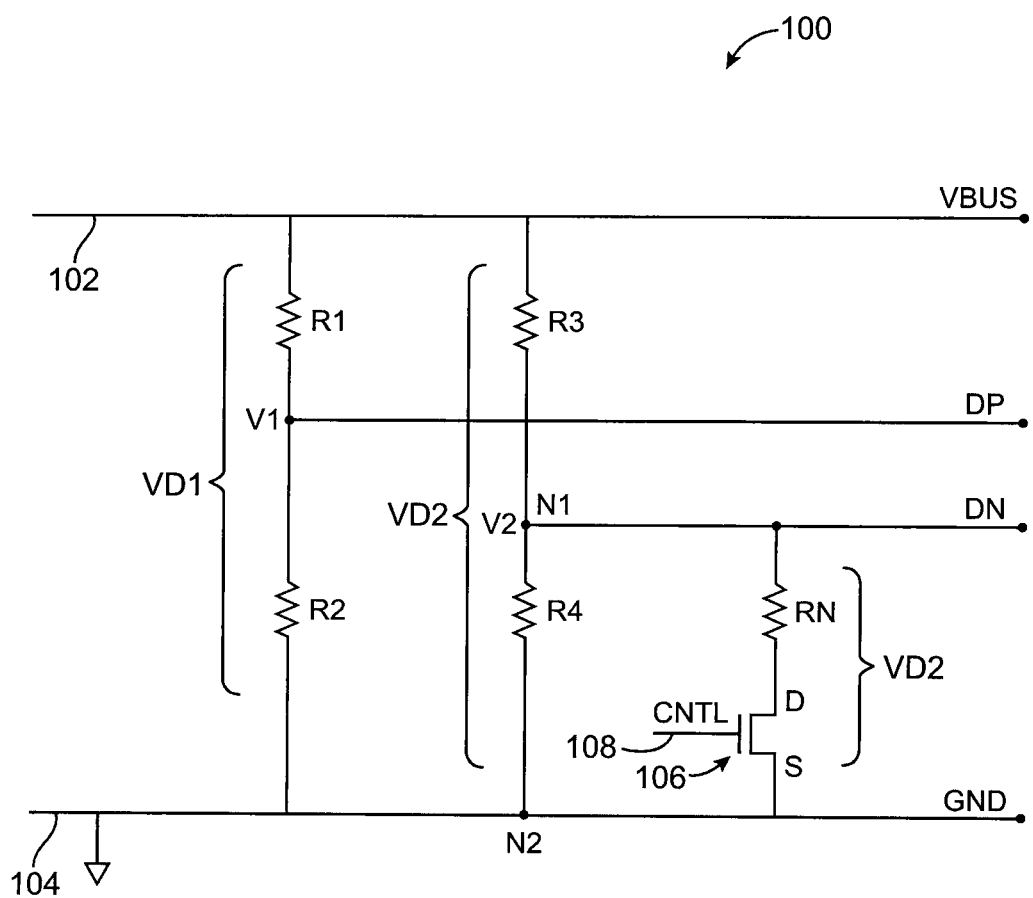
FIG. 3 is a circuit diagram of illustrative circuitry that may be used in a multiport power converter to convey port power capacity information to equipment that is connected to the power converter in accordance with an embodiment of the present invention.

Illustrative voltage-coding circuitry of the type that may be used in control circuitry 54 is shown in FIG. 3. As shown in FIG. 3, voltage-coding circuitry 100 (which may sometimes be referred to as communications circuitry, adjustable voltage divider circuitry, or coding circuitry), may be formed from parallel voltage dividers VD1 and VD2. Voltage divider VD1 includes series-connected resistors R1 and R2. Voltage divider VD2 may include resistor R3 and an adjustable resistor that is formed from the parallel combination of resistor R4 (in a first branch) and resistor RN and transistor 106 (in a second branch).

Line 102 may be connected to a source of positive voltage (e.g., line 64) and line 104 may be connected to ground (e.g., ground terminal 70). In a two-port power converter, there may be one of circuits 100 associated with port A and one of circuits 100 associated with port B. In port A, connector terminal Vbus of the first version of circuit 100 is connected to terminal P in connector 20A. Connector terminal Vbus of the second version of circuit 100 is connected to terminal P in connector 20B of port B. Similarly, terminals DP and DN in the first instance of circuit 100 are associated with DP and DN in connector 20A and terminals DP and DN in the second instance of circuit 100 are associated with connector 20B. In the first instance of circuit 100, ground terminal GND is coupled to ground terminal G of connector 20A (line 74A). In the second instance of circuit 100, ground terminal GND is coupled to ground terminal G of connector 20B (line 74B).

In a typical scenario, line 102 is provided with a positive supply voltage at 5 V and line 104 is provided with a ground supply voltage of 0 volts. Resistors R1 and R2 may be selected to produce a desired fixed voltage value V1 on line DP. In voltage divider VD2, a variable voltage V2 may be produced on node N1. Resistor R3 may be coupled between line 102 and node N1. A variable resistor may be coupled between node N1 and node N2.

In the FIG. 3 example, the variable resistor between nodes N1 and N2 has been implemented using the parallel combination of two resistances. The first resistance is a fixed resistance associated with resistor R4. The second resistance varies depending on the state of control switch 106. Control switch 106 may be implemented using a transistor or other suitable switching circuit. In the example of FIG. 3, switch 106 has been implemented using an n-channel metal-oxide-semiconductor (NMOS) transistor. Control circuitry 54 (FIG. 2) may generate time-varying or static control signals CNTL on line 108 at the gate of transistor 106. The value of the control signal CNTL on line 108 determines the state of transistor 106. If CNTL is high, transistor 106 will be on and drain terminal D will be shorted to source terminal S. If CNTL is low, transistor 106 will be off and will form an open circuit (infinite resistance) between drain terminal D and source S.

The state of transistor 106 therefore controls the resistance between nodes N1 and N2. When transistor 106 is off, there is an open circuit between drain D and source S, so the resistance between nodes N1 and N2 is equal to the resistance of resistor R4. When transistor 106 is on, both of the parallel resistor paths between node N1 and node N2 are active. In this situation, the resistance between node N1 and N2 is given by the parallel combination of R4 and RN (i.e., R4*RN/(R4+RN)). When transistor 106 is off, the voltage V2 has a first (higher) value associated with the relative strengths of resistors R3 and R4. When transistor 106 is on, the voltage V2 has a second (lower) value associated with the relative strengths of resistor R3 and the combination of resistor R4 in parallel with resistor RN.

With this type of circuit, control circuitry 54 can adjust the values of V1 and V2. The values of V1 and V2 and/or their relative values can be used as codes. An electronic device that is connected to converter 12 can monitor the values of V1 and V2 over the DP and DN lines in a USB cable and can take appropriate action based on the V1 and V2 values. One combination of V1 and V2 may, for example, correspond to a situation in which the device should be configured to draw 10 W of power (i.e., when the per-port available DC power is 10 W) and another combination of V1 and V2 may, for example, correspond to a situation in which the device should be configured to draw 5 W of power (i.e., when the per-port available DC power is 5 W).

Figure 4:
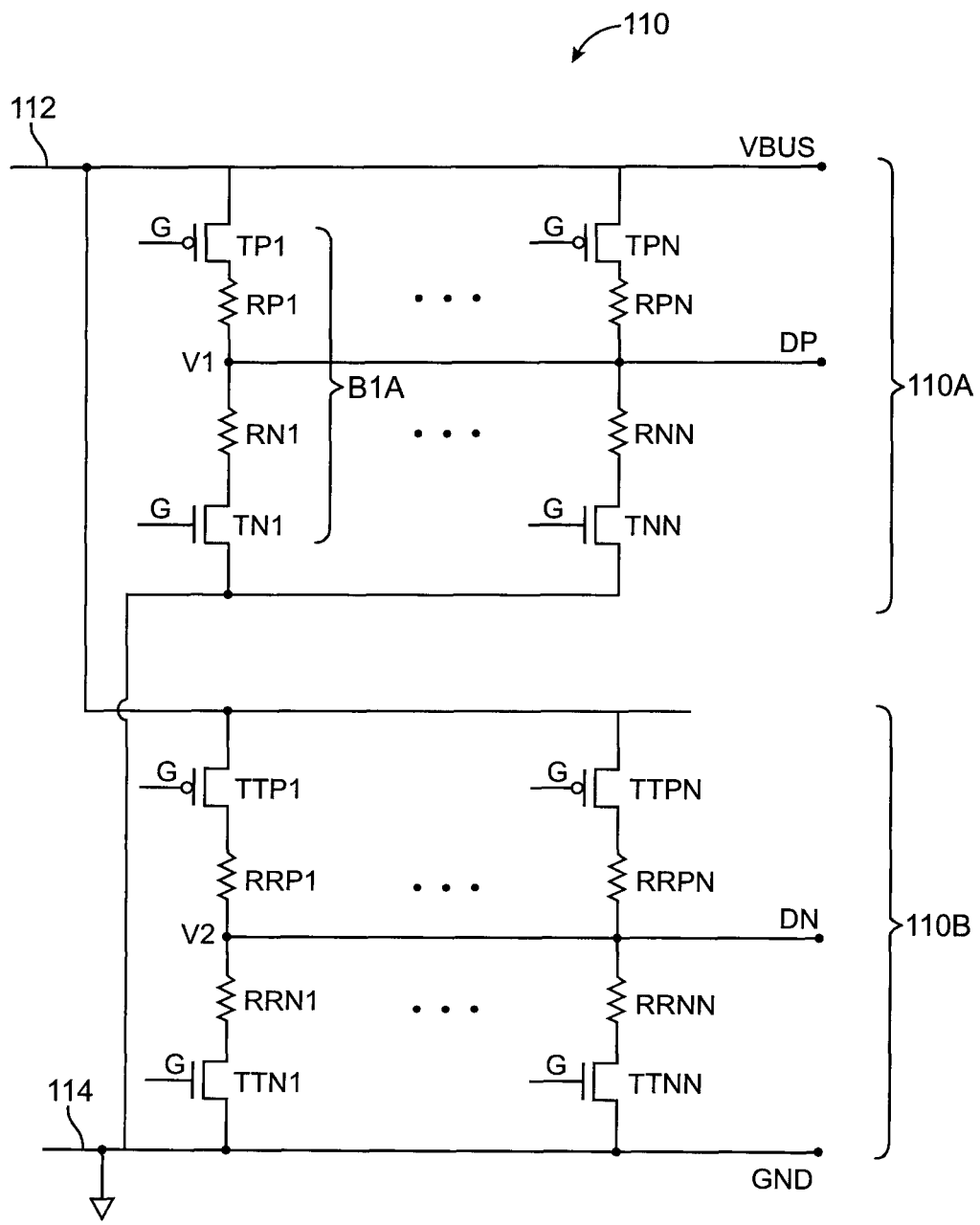
FIG. 4 is a circuit diagram of a configurable voltage divider with multiple control transistors that may be used in a multiport power converter to convey port power capacity information to equipment that is connected to the power converter in accordance with an embodiment of the present invention.

Another circuit that may be used in control circuitry 54 to produce desired values of V1 and V2 on connector terminals DP and DN is shown in FIG. 4. In circuitry 110 of FIG. 4, line 112 may be connected to a source of positive voltage (e.g., line 64 in FIG. 2) and line 114 may be connected to ground (e.g., ground terminal 70 in FIG. 2). As with circuit 100 of FIG. 3, there may be a respective one of circuits 110 associated with each port in power converter 12. For example, there may be one of circuits 110 associated with port A and one of circuits 110 associated with port B in a two-port configuration.

The values of V1 and V2 that are produced by circuitry 110 may be controlled by control circuitry 54 by applying appropriate digital control signals (logic ones and zeros) to the gates G of the control transistors of circuitry 110. As shown in FIG. 4, circuitry 110 may have a first adjustable voltage divider circuit 110A that produces voltage V1 and a second adjustable voltage divider circuit 110B that produces voltage V2.

Each adjustable voltage divider has a number of branches. Each branch has an upper segment and a lower segment. The upper segments include p-channel metal-oxide-semiconductor (PMOS) transistors and the lower segments include n-channel metal-oxide-semiconductor (NMOS) transistors. Each branch also includes a pair of transistors, one of which is in the upper segment of that branch and one of which is in the lower segment of that branch. For example, the first branch of circuit 110A (branch B1A) has an upper segment that contains PMOS transistor TP1 and resistor RP1 and has a lower segment that contains NMOS transistor TN1 and resistor RN1. The upper segments of the branches of voltage divider 110A may each have a different respective resistance (RP1, . . . RPN) and the lower segments of the branches of voltage divider 110A may likewise each have a different respective resistance (RN1, . . . RNN). By turning on a given one of the PMOS transistors and a given one of the NMOS transistors in circuit 110A while all other transistors in circuit 110A are turned off, a desired voltage divider may be formed by circuit 110A and therefore a desired value of V1 on terminal DP may be produced. If desired, multiple transistors (e.g., multiple NMOS transistors and/or multiple PMOS transistors) may be turned on at the same time in circuit 110A, thereby creating parallel resistance circuits of desired resistance values. Adjustable voltage divider 110B may be operated in the same way as adjustable voltage divider 110A to produce a desired value of V2 on terminal DN.

Figure 5:
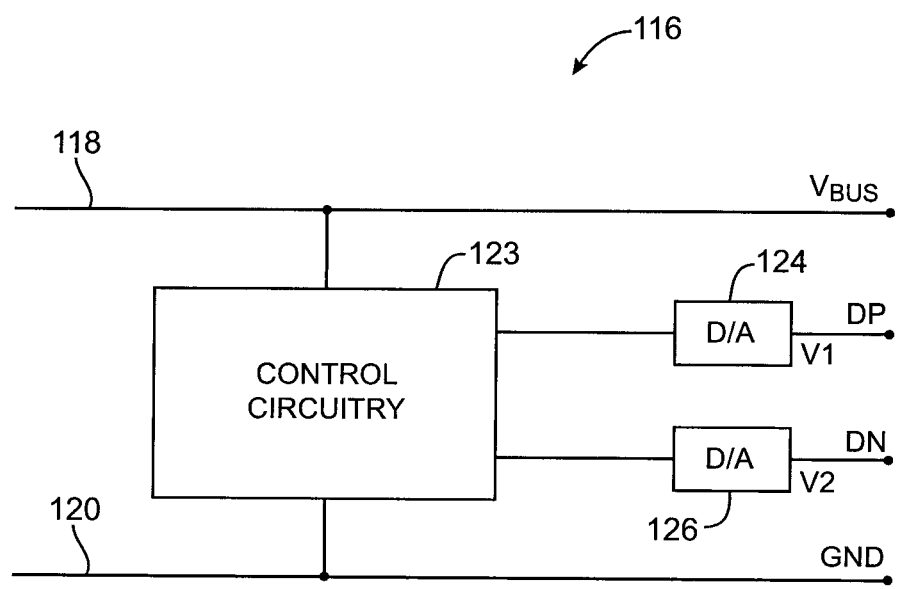
FIG. 5 is a circuit diagram of illustrative control circuitry and digital-to-analog converter circuitry that may be used in a multiport power converter to convey port power capacity information to equipment that is connected to the power converter in accordance with an embodiment of the present invention.

The adjustable voltage divider circuitry of FIGS. 3 and 4 serves as a type of digital-to-analog (D-to-A) converter circuit for producing desired V1 and V2 values. An illustrative circuit that is based on D-to-A circuits 124 and 126 (e.g., integrated circuit D-to-A circuits) is shown in FIG. 5. In this type of arrangement, control circuitry 123 may be implemented using the resources of control circuitry 54. D-to-A converters 124 and 126 may also be implemented within circuitry 54. Line 118 may receive a positive power supply voltage from line 64 of FIG. 2 and ground line 116 may receive a 0 volt ground signal from line 70 of FIG. 2. Terminals VBUS, DP, DN, and GND may be associated with a connector in a port in power converter 12. Multiple circuits 116 may be used in converters that include multiple ports.

During load sensing operations, control circuitry 54 may determine the per-port power that is available to the devices that have been connected to the ports of converter 12. The available per-port power level may then be communicated to the connected devices. For example, control circuitry 123 may provide digital signals to D-to-A converter 124 that direct D-to-A converter 124 to produce a desired value of V1 on terminal DP. Control circuitry 123 may also provide digital signals to D-to-A converter 126 that direct D-to-A converter 126 to produce a desired value of V2 on terminal DN. Each device 10 may include voltage detector circuitry and control logic that can monitor lines DP and DN and that can recognize the coded per-port power information being transmitted by control circuitry 123. Each device 10 may then adjusts its power draw to accommodate the per-port available power from converter 12.

If desired, more complex communications circuits can be used by control circuitry 123. For example, D-to-A converters 124 and 126 can be omitted so that control circuitry 123 can be connected directly to terminals DP and DN. An asynchronous or synchronous digital communications link may then be established over paths DP and DN between converter 12 and each attached device. This communications link may be unidirectional or bidirectional and may involve the transmission of signals using any suitable coding scheme.

Figure 6:
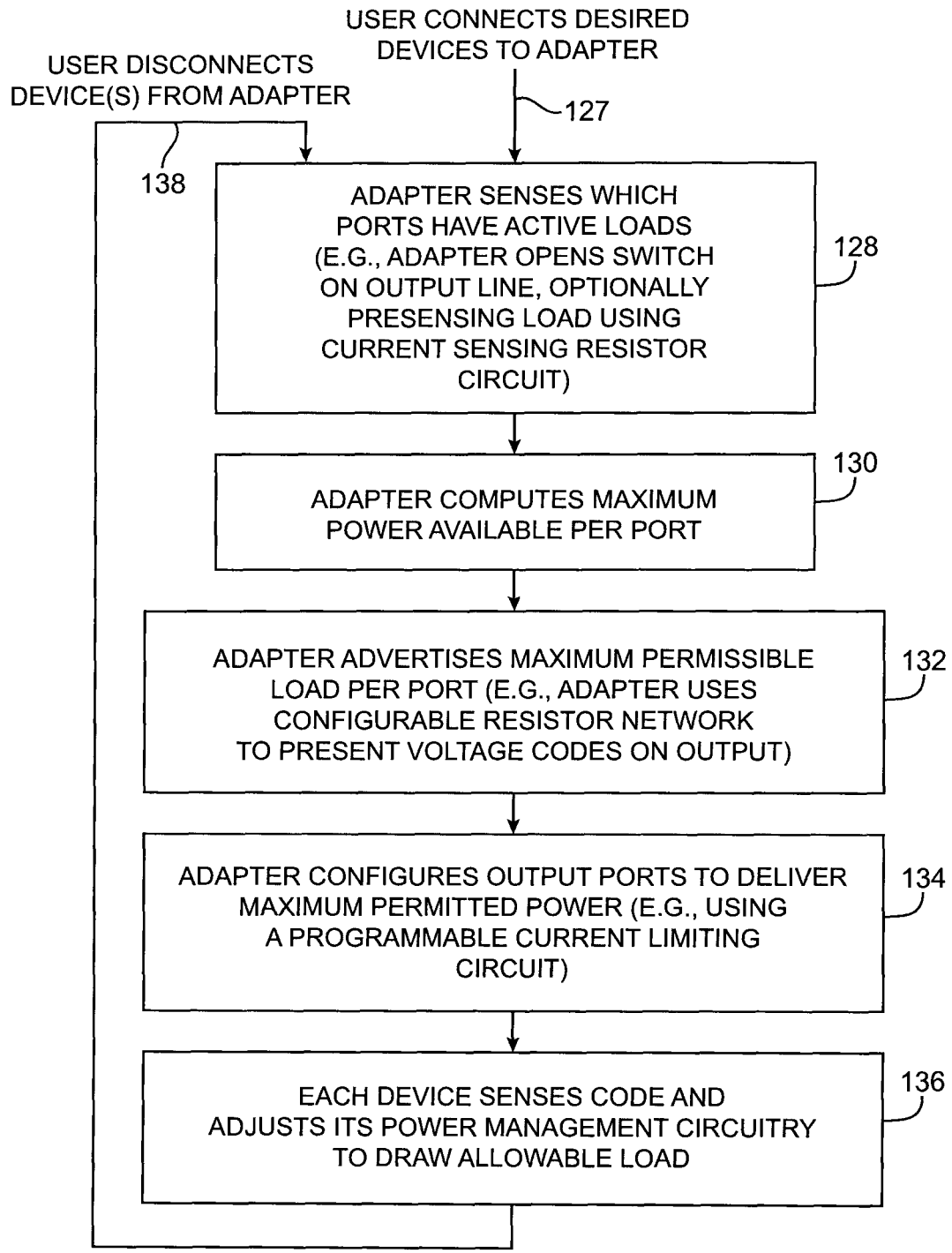
FIG. 6 is a flow chart of illustrative steps involved in operating multiport power converter circuitry in accordance with an embodiment of the present invention.

Illustrative steps involved in using power converter 12 are shown in FIG. 6. Initially, as shown by line 127, a user may decide to connect one or more devices 10 or other loads to respective ports in power converter 12.

Power converter 12 may periodically monitor the status of its ports. For example, control circuitry 54 may periodically make load current measurements as described in connection with FIG. 2 (step 128). From these measurements, control circuitry 54 can determine which of the ports in power converter 12 are connected to loads. If, for example, there are three ports in converter 12 and a user has plugged only a single device into one of these three ports, control circuitry 54 can determine that only one device is present. If, as another example, three separate electronic devices are plugged into the three ports, control circuitry 54 can determine from load measurements that all three ports are occupied.

Following a determination of the number of ports to which electronic devices have been attached at step 128, power converter 12 can use control circuitry 54 to compute the maximum per-port power available (step 130). For example, if power converter 12 has a converter circuit such as circuit 122 with a 10 W capacity and there are three occupied ports, control circuitry 54 will determine that the per-port available power level is 10 W divided by three (i.e., 3.33 W). If fewer devices are connected, the per-port available power level will be larger.

At step 132, control circuitry 54 may advertise the amount of power that is available on each port. Any suitable communications scheme may be used. For example, control circuitry 54 may use a voltage coding scheme of the type described in connection with FIGS. 3, 4, and 5 to produce a set of voltages V1 and V2 that indicate the value of the per-port available power. Schemes based on more complex digital communications protocols (e.g., bidirectional protocols, etc.) may also be used.

Control circuitry 54 may limit the current that is drawn by the connected devices. For example, control circuitry 54 can monitor the amount of current (and therefore the amount of power) that is delivered through each port by monitoring the voltage drop across current sensing resistors such as resistors RA and RB of FIG. 2. If the power flowing to a given port starts to exceed the maximum allowed per-port limit, the power flowing to that port can be regulated. For example, control circuitry 54 can adjust a control switch that is associated with the port to reduce or interrupt power flow (e.g., by adjusting switch SWA to prevent excessive power from flowing to the device that is connected to port A, by adjusting switch SWB to regulate power flow to port B, etc.). Switches such as switches SWA and SWB may be adjusted using analog or digital control signals, fixed or time-varying control signals, or any other suitable control signals to impose desired power limits. Power regulation can also be performed using circuit 122. Fuses, circuit breakers, or other power-limiting devices or circuits can also be used to ensure that power limits are not exceeded.

At step 136, the electronic devices 10 that are attached to power converter 12 can receive and decode the encoded per-port available power information that was transmitted from control circuitry 54 during the operations of step 132. If, for example, there is only a single device connected to converter 12, the device might receive and process information that 10 W of power is available from converter 12. That device may then use its power management circuitry to adjust the amount of power that is being drawn from converter 12 to a matching value (i.e., 10 W). If, however, there were two devices connected to converter 12, the devices might each receive and process information indicating that 5 W of power is available per port. Each of the two devices may then use its power management circuitry to adjust its power draw to match the available 5 W of power.

As illustrated by line 138, the steps of FIG. 6 involved in using power converter 12 may be repeated. For example, the steps of FIG. 6 may be repeated after a user disconnects one or more devices 10 or other loads from their respective ports in power converter 12 (e.g., whenever a user disconnects one or more of the devices or other loads connected to power converter 12). This type of arrangement may help to ensure that devices 10 which are still connected to power converter 12 can receive the maximum amount of power available from power converter 12 (e.g., that power converter 12 does not reserve power for ports which are no longer connected to a device or other load). With one suitable arrangement, the steps of FIG. 6 may be continuously repeated or repeated at certain intervals (e.g., every 5 seconds, every 10 seconds, every 30 seconds, every minute, every five minutes, or at other suitable intervals). In general, the steps of FIG. 6 may be repeated at any periodic or random interval.

The foregoing is merely illustrative of the principles of this invention and various modifications can be made by those skilled in the art without departing from the scope and spirit of the invention.

What is claimed is:

1. An apparatus configured to provide power and power level data for a plurality of external electronic devices, the apparatus comprising:
   a plurality of ports;
   load detection circuitry that detects when at least one of the plurality of external electronic devices is connected to the apparatus, wherein the load detection circuitry comprises a control switch and a current-limited voltage regulator configured to provide an output voltage larger than a nominal power supply output voltage; and control circuitry configured to:
compute a per-port available power level that varies based on a number of active loads connected to the plurality of ports, and
provide a code to at least one external electronic device of the plurality of external electronic devices, via a data terminal of at least one port of the plurality of ports, wherein the code comprises data corresponding to the per-port available power level available to the at least one external electronic device and provides a reference for the at least one external electronic device to adjust an amount of power received from the at least one port.

2. The apparatus of claim 1, wherein the control circuitry comprises voltage divider circuitry that produces at least one adjustable output voltage for each port of the plurality of ports.

3. The apparatus of claim 1, wherein:
each port of the plurality of ports is configured with two data terminals; and
the control circuitry adjusts voltages at the two data terminals to advertise the per-port available power level to the at least one external electronic device of the plurality of external electronic devices.

4. The apparatus of claim 1, wherein the load detection circuitry further comprises a plurality of control switches, each control switch of the plurality of control switches being associated with a respective port of the plurality of ports.

5. The apparatus of claim 1, wherein the load detection circuitry comprises a plurality of current-sensing resistors, each current-sensing resistor of the plurality of current-sensing resistors being associated with a respective port of the plurality of ports.

6. The apparatus of claim 1, wherein:
each port of the plurality of ports is configured with two power terminals; and
the load detection circuitry comprises a plurality of current-sensing resistors, each current-sensing resistor of the plurality of current-sensing resistors being coupled to one of the two power terminals.

7. The apparatus of claim 6, wherein:
the load detection circuitry further comprises a plurality of current-limited voltage regulators; and
each current-limited voltage regulator of the plurality of current-limited voltage regulators produces the output voltage that is applied at one of the two power terminals.

8. The apparatus of claim 7, wherein the load detection circuitry further comprises a plurality of switches, each switch of the plurality of switches having a terminal that is connected to an output of at least one of the plurality of current-limited voltage regulators.

9. The apparatus of claim 1, wherein the control circuitry comprises a digital-to-analog converter providing at least one analog voltage to at least one data terminal.

10. The apparatus of claim 1, further comprising an alternating current to direct current converter.

11. The apparatus of claim 1, further comprising a plurality of connectors,
wherein each connector of the plurality of connectors is configured with two power terminals and two data terminals, and is associated with a respective port of the plurality of ports.

12. A device for managing a supply of power to a plurality of external electronic devices, the device comprising:
a plurality of ports configured to provide power to the plurality of external electronic devices;
circuitry that detects when at least one external electronic device of the plurality of external electronic devices is connected to the device; and
control circuitry configured to:
determine a per-port available power level for each port of the plurality of ports based on a number of active loads that are connected to the plurality of ports, and
provide a code to the at least one external electronic device of the plurality of external electronic devices, via at least one data terminal of a port of the plurality of ports, wherein the code comprises data corresponding to the per-port available power level for the at least one external electronic device and provides a reference for the at least one external electronic device to adjust an amount of power received from the port.

13. The device of claim 12, wherein the control circuitry further comprises a digital-to-analog converter that is coupled to the at least one data terminal to provide the code to inform the at least one external electronic device of the plurality of external electronic devices of the per-port available power level.

14. The device of claim 12, wherein the control circuitry comprises adjustable voltage divider circuitry.

15. The device of claim 14, wherein the adjustable voltage divider circuitry comprises a plurality of resistors and at least one transistor having a gate that receives a control signal from the control circuitry.

16. The device of claim 15, wherein the adjustable voltage divider circuitry further comprises a plurality of p-channel metal-oxide-semiconductor transistors and a plurality of n-channel metal-oxide-semiconductor transistors connected in a plurality of branches between a positive power supply line and a ground power supply line.

17. A method of operating an apparatus that includes a plurality of ports that are configured to be coupled to at least one external electronic device of a plurality of external electronic devices, the method comprising:
determining a number of ports of the plurality of ports that are connected to an active load;
determining a per-port available power level that is available to the at least one external electronic device of the plurality of external electronic devices connected to at least one port of the plurality of ports; and
providing a code to the at least one external electronic device through a data line of the at least one port, wherein the code comprises data corresponding to the per-port available power level for the at least one external electronic device of the plurality of external electronic devices and provides a reference for the at least one external electronic device of the plurality of external electronic devices to adjust an amount of power received from the at least one port of the plurality of ports.

18. The method of claim 17, wherein the code includes digital data.

19. The method of claim 18, wherein the apparatus provides the code to the at least one external electronic device of the plurality of external electronic devices using adjustable voltage divider circuitry.

20. The method of claim 17, wherein the apparatus provides the code to the at least one external electronic device of the plurality of external electronic devices using bidirectional communication protocols over the data line.

* * * * *